(12) United States Patent
Yasuda

(10) Patent No.: US 7,474,412 B2
(45) Date of Patent: Jan. 6, 2009

(54) ETALON DEVICE AND MANUFACTURING METHOD THEREOF

(75) Inventor: Tomoaki Yasuda, Hino (JP)

(73) Assignee: Olympus Corporation, Tokyo (JP)

( * ) Notice: Subject to any disclaimer, the term of this patent is extended or adjusted under 35 U.S.C. 154(b) by 47 days.

(21) Appl. No.: 11/590,754

(22) Filed: Nov. 1, 2006

(65) Prior Publication Data

US 2007/0097479 A1    May 3, 2007

(30) Foreign Application Priority Data

Nov. 1, 2005    (JP)    ............... 2005-318433

(51) Int. Cl.
*G01B 9/02*    (2006.01)
(52) U.S. Cl. .................................... 356/519
(58) Field of Classification Search ................. 356/454, 356/480, 519; 359/578
See application file for complete search history.

(56) References Cited

U.S. PATENT DOCUMENTS 6,989,901 B2 *    1/2006  Abbink ..................... 356/451

2003/0011864 A1    1/2003  Flanders

FOREIGN PATENT DOCUMENTS

| DE | 40 23 154 A1 | 1/1992 |
| JP | 6-241899 | 9/1994 |
| WO | WO 02/24570 A1 | 3/2002 |

\* cited by examiner

*Primary Examiner*—Michael A Lyons
(74) *Attorney, Agent, or Firm*—Pillsbury Winthrop Shaw Pittman LLP

(57) ABSTRACT

An etalon device comprises a pair of parallel plates each of which is arranged to be faced each other, a pair of holder portions which hold individually a pair of the parallel plates respectively, and a housing portion arranged at the outside of the pair of the holder portions, wherein at least one of the pair of the holder portions has a concave portions in its inner peripheral surface, which the parallel plate corresponding to it touches, and an inclined surface is arranged at, at least either the concave portions or the parallel plates. The inclined surface is formed on the outer peripheral portion of the parallel plate. Thereby, the etalon device having simple constitution which can be assembled by adjusting the parallelism of the surfaces of the corresponding parallel plates, and manufacturing method of it can be provided.

11 Claims, 9 Drawing Sheets

ETALON DEVICE AND MANUFACTURING METHOD THEREOF

This application claims benefits of Japanese Application No. 2005-318433 filed in Japan on Nov. 1, 2005, the contents of which are hereby incorporated by reference.

BACKGROUND OF THE INVENTION

1. Field of the Invention

The present invention relates to an etalon device that can be applied to optical systems such as Fabry-Perot type light interferometer, spectrum analyzer etc., and manufacturing method thereof.

2. Description of the Related Art

So far, as a conventional etalon device has been known for example, as shown in Japanese published unexamined patent application Toku Kai Hei 6-241899 etc. FIG. 1 is a schematic view showing an example of composition of the conventional etalon device as shown in Japanese published unexamined patent application Toku Kai Hei 6-241899, etc. FIG. 1A is a longitudinal sectional diagram. FIG. 1B is a sectional diagram along A-A' of FIG. 1A. As shown in FIG. 1, in this kind of the conventional etalon device, parallel plates 51 and 52 are used as an etalon. The parallel plates 51 and 52, are formed in disk like shape. The parallel plates 51 and 52 are fixed to the inner peripheral surfaces 53a and 54a of holders 53 and 54 by adhesives etc. In the state where each of the optical surfaces of the parallel plates 51 and 52 is faced, one set of subassembly (stationary etalon plate 51, movable etalon plate 52) is positioned through a body 57. A piezo-electric element 56 is incorporated in the body 57. A holder 54 of the movable etalon plate 52 is moved by pressure through the piezo-electric element 56. In this way, it has such structure for changing a separation of surfaces of the parallel plates 51 and 52 which are faced each other.

SUMMARY OF THE INVENTION

The etalon device according to the present invention is characterised in that it comprises a pair of parallel plates each of which is arranged to be faced each other, a pair of holder portions which hold individually a pair of the parallel plates, respectively, a housing portion arranged at the outside of a pair of the holder portions, wherein at least one of a pair of the holder portions has a concave portion in its inner peripheral portion, which the parallel plate corresponding to it touches, and also an inclined surface is arranged at, at least either the concave portion or the parallel plate.

In the etalon device of the present invention, it is desired that the inclined surface is formed on the outer peripheral portion of the parallel plate. In the etalon device of the present invention, it is desired that the inclined surface is formed in a predetermined position of the concave portion, and the predetermined position is a position which the outer peripheral portion of the parallel plate touches.

In the etalon device of the present invention, it is desired that a surface shape of the inclined surface is a curved surface. In the etalon device of the present invention, it is desired that a surface shape of the inclined surface is a plane. In the etalon device of the present invention, it is desired that the surface shape of the inclined surface includes a plane and a curved surface. In the etalon device of the present invention, it comprises further a separation variable means for changing surface separation of a pair of the parallel plates.

A manufacturing method of the etalon device according to the present invention is characterised in that it comprises a process for arranging a pair of parallel plates so as to be faced each other; a process for holding temporarily one of a pair of the parallel plates so as to enable to carry out tilt operation; a process for holding another of a pair of the parallel plates in the fixed state; and a process in which a surface of the parallel plate and a surface of the other parallel plate are touched in such state that each of the surfaces is faced each other, and then one of the parallel plates is fixed.

According to the etalon device according to the present invention, though it is simple constitution, a highly efficient etalon device can be is realized. According to the etalon device of the present invention, at the time of assembling the etalon device by touching (pushing) one of parallel plates to the other parallel plate, two parallel plates can be adjusted so that a gap of the parallelism of parallel plates surfaces which are faced each other may become the minimum or nearly zero. Therefore, for example, even when a piezo-electric element is used, the stroke of the piezo-electric element can be used only for changing the surface interval. Thereby, compared with the piezoelectric device in the conventional etalon device, it is not necessary to use the piezo-electric element for adjusting the tilt of the surfaces of parallel plates which are faced. Therefore, to such extent, the stroke of the piezo-electric element can be shortened. As a result, a miniaturized etalon device can be obtained.

According to manufacturing method of the etalon device of the present invention, in spite of simple procedure, two parallel plates can become a state having high parallelism. These and other features and advantages of the present invention will become apparent from the following detailed description of the preferred embodiments when taken in conjunction with the accompanying drawings.

BRIEF DESCRIPTION OF THE DRAWINGS

FIG. 1B is a sectional diagram along line A-A' of FIG. 1A.

DETAILED DESCRIPTION OF THE PREFERRED EMBODIMENTS

In advance of explanation of embodiments, the more concrete constitution, function and effect of the present invention will be explained. The etalon device of the present invention comprises a pair of parallel plates which is arranged so as to be faced each other, and a pair of holder portions. The pair of holder portions hold individually each of outer peripheral portions of a pair of the parallel plates, respectively. At least, one of a pair of the holder portions has a concave portion in which a parallel plate (parallel plate mounted on this holder portion) touches its inner peripheral portion. An inclined surface is arranged at least to one of parallel plates and the concave portion (holder portion).

Here, if a group of one parallel plate and a component of one holder portion is called as a subassembly, a pair of parallel plates and a pair of holder portions are divided into two party assemblies. If one of the two party assemblies is called as an adjustment side subassembly, and another of the two party assemblies is called as a stationary side subassembly, the adjustment side subassembly has an inclined surface while having a concave portion. In the adjustment side subassembly, the parallel plate touches the concave portion of the holder portion through this inclined surface. At this time, the parallel plate can be moved through the inclined surface. In the adjustment side subassembly, the parallel plate can be moved when assembling of an etalon device starts.

On the other hand, as for the stationary side subassembly, there are a case where it has the concave portion, and another case where it does not have the concave portion. Furthermore, the stationary side subassembly may have the inclined surface, or may not have it. In the stationary side subassembly, in any case, the parallel plate is being fixed to the holder portion at the time of start of assembling of the etalon device.

Figure 10:
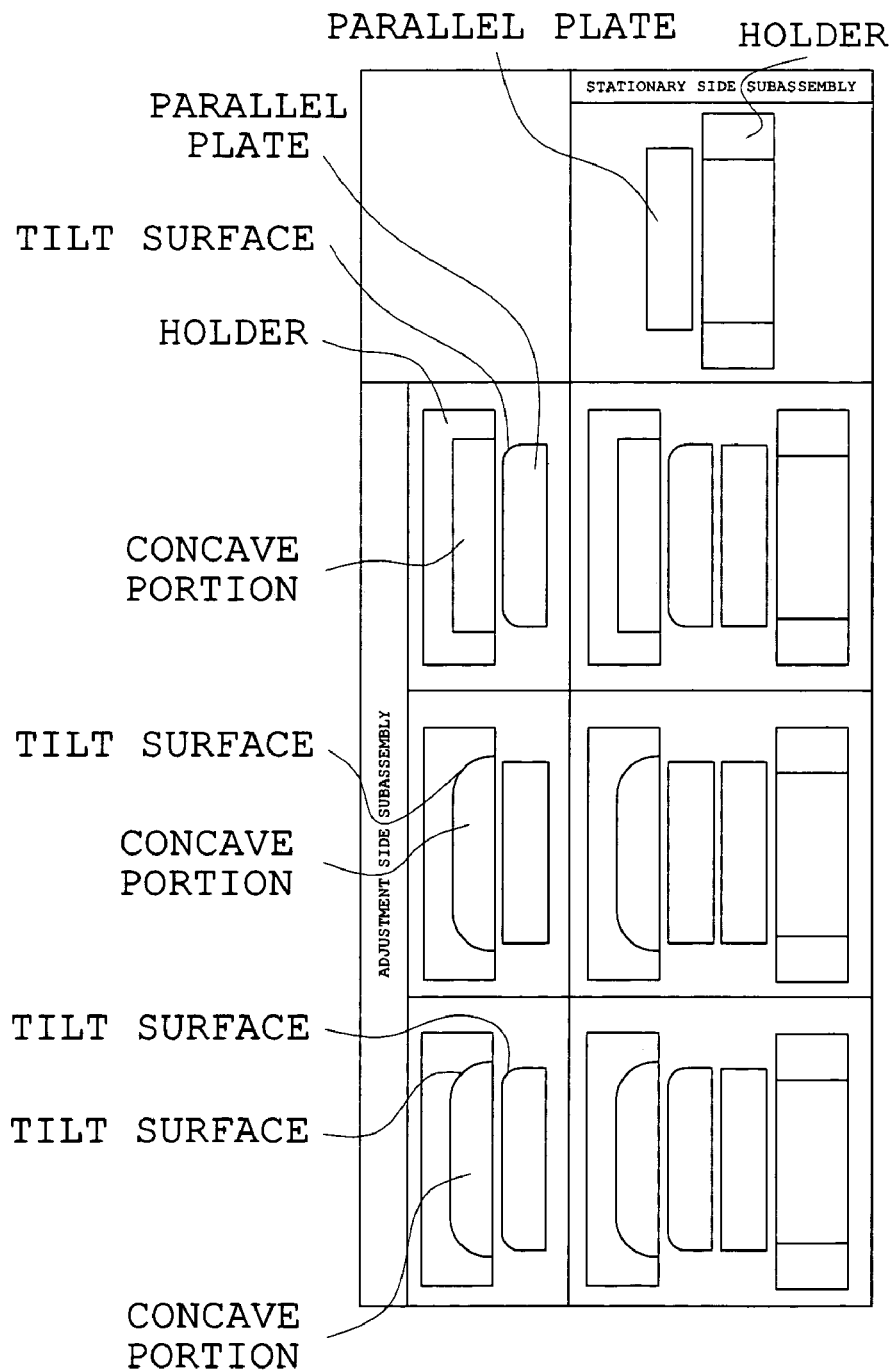
FIG. 10 is an explanatory diagram showing an example wherein an adjustment side subassembly has a concave portion and an inclined surface, and a stationary side subassembly has neither a concave portion nor an inclined surface in the etalon device.
Figure 11:
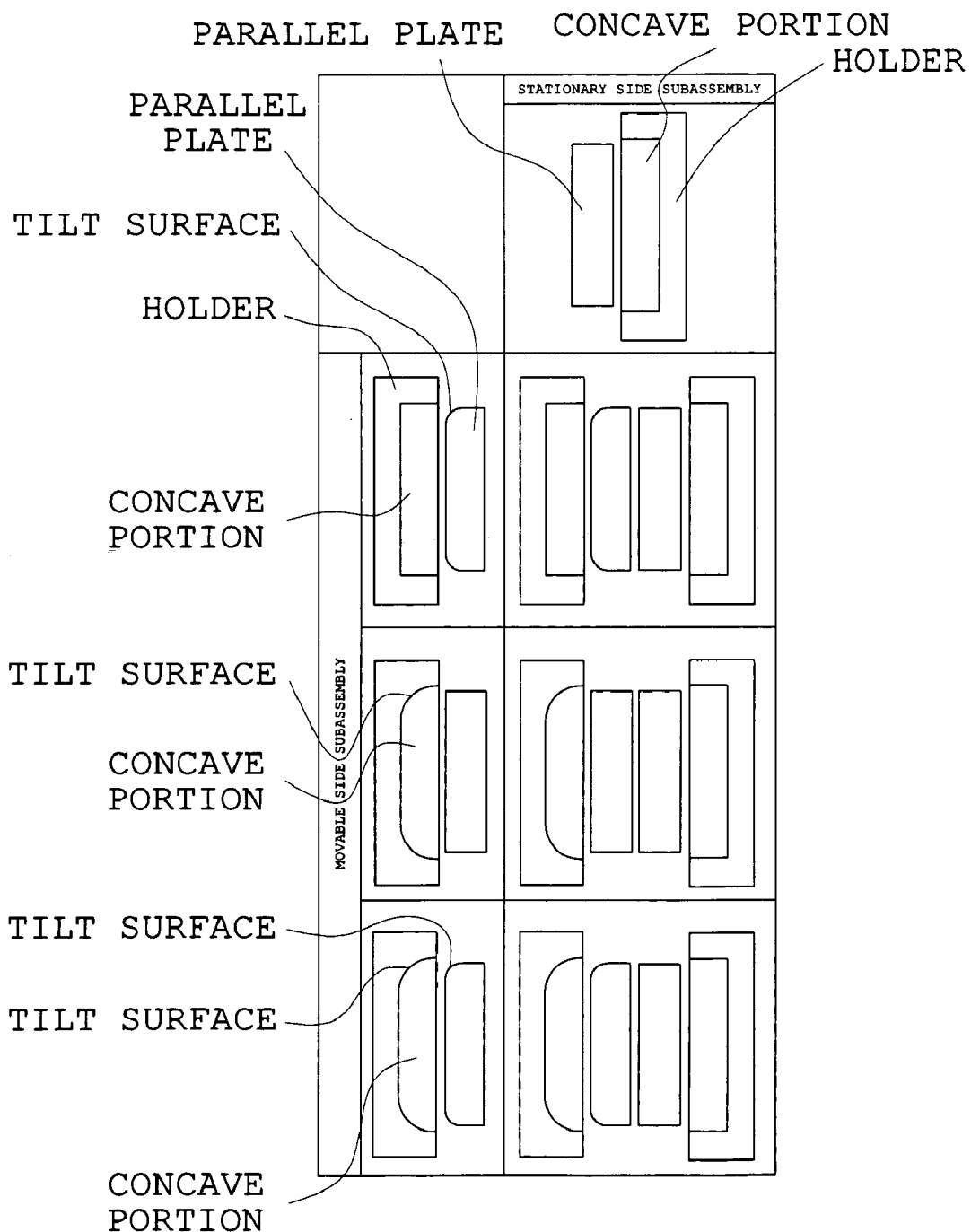
FIG. 11 is an explanatory diagram showing an example wherein an adjustment side subassembly has a concave portion and an inclined surface, and a stationary side subassembly has a concave portion, but does have not an inclined surface in the etalon device.
Figure 12:
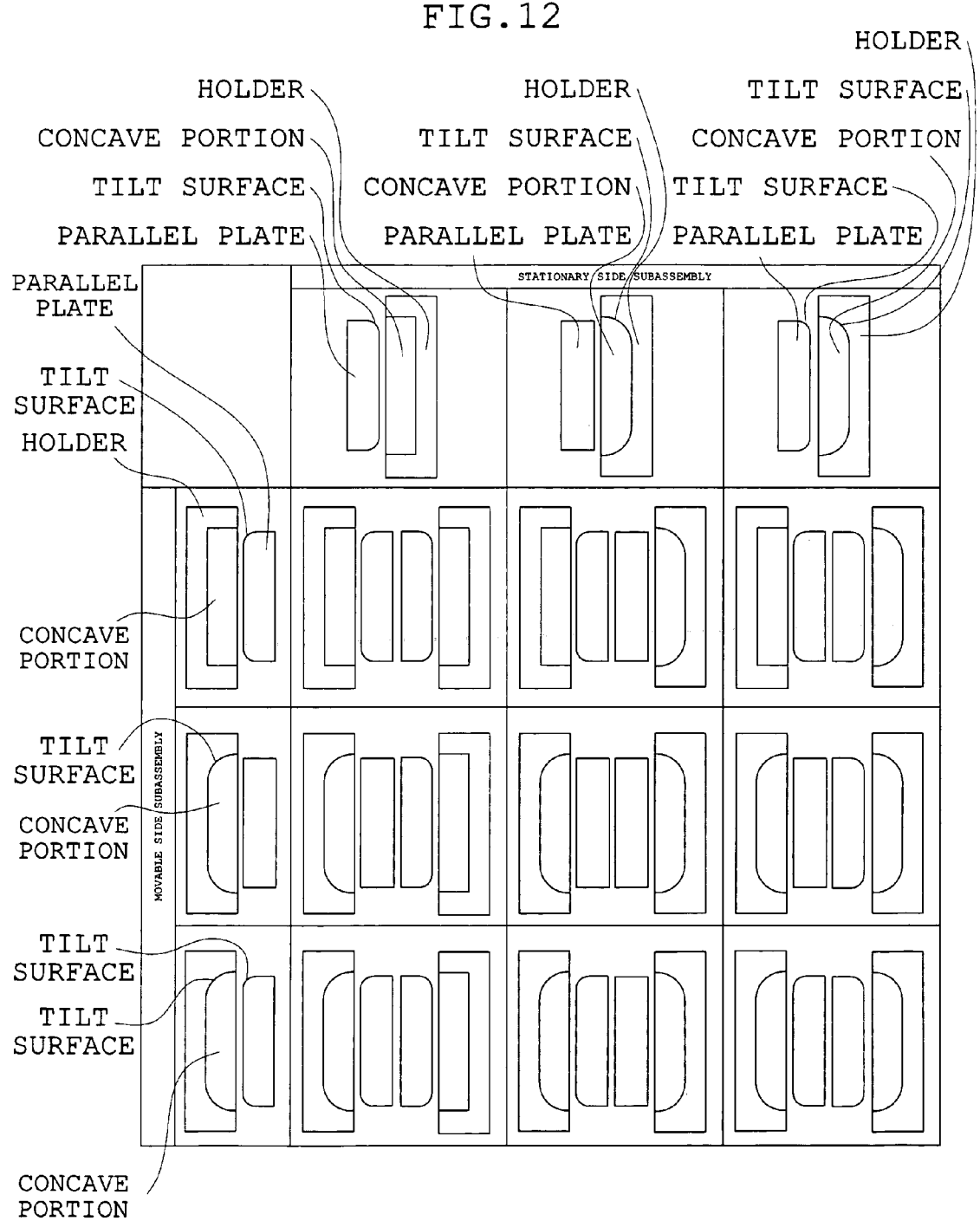
FIG. 12 is an explanatory diagram showing an example wherein the adjustment side subassembly has a concave portion and an inclined surface, and the stationary side subassembly also has a concave portion and an inclined surface in the etalon device.

The explanation mentioned above can be summarized as follows: the structure of the adjustment side subassembly and the stationary side subassembly becomes combinations as shown in FIGS. 10 to 12. FIG. 10 shows a case where the adjustment side subassembly has the concave portion and the inclined surface, and the stationary side subassembly has neither the concave portion nor the inclined surface. FIG. 11 shows a case where the adjustment side subassembly has the concave portion and an inclined surface, and the stationary side subassembly has the concave portion, but does have not the inclined surface. FIG. 12 shows a case where the adjustment side subassembly and the stationary side subassembly have the concave portion and the inclined surface.

According to the etalon device constituted in this way, at the time of assembling, if the surface of the parallel plate of the adjustment side subassembly is touched the surface of the parallel plate of the stationary side subassembly, the surface of the parallel plate of the adjustment side subassembly is moved toward tilt direction along the surface of the parallel plate of the stationary side subassembly. As a result, to the surface of the parallel plate of the stationary side subassembly, the surface of the parallel plate of the adjustment side subassembly is adjusted to be parallel (namely, a state in which difference of inclination becomes zero extremely). The parallel plate of the adjustment side subassembly is fixed to the holder, for example using adhesives etc. In this way, an adjustment of the parallelism of the surfaces of a pair of parallel plates which are faced each other, and assembling of an etalon device are carried out. And, by moving at least one of the stationary side subassembly and the adjustment side subassembly, a predetermined separation between a pair of the parallel plates be is obtained. Thereby, a highly efficient etalon device can be obtained.

Figure 15:
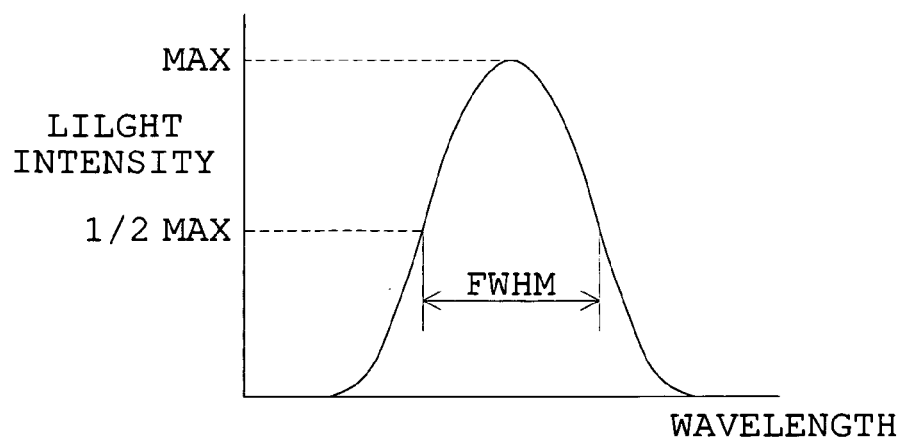
FIG. 15 is an explanatory diagram showing a full width at half maximum in exit light.

Here, the predetermined separation between a pair of the parallel plates can be obtained through the separation variable means. Since parallelism of the surfaces of a pair of the parallel plates each of which are faced is kept, even if the separation is changed, a high performance etalon device is obtained also in this case. Here, as for high performance, it means concretely that transmission is high and the value of full width at half maximum (FWHM) is small. That is, as for "transmission is high", it means that when an etalon device is used for spectrum means, light having a desired wavelength can be exited with large (strong) light intensity. In fact, light of the wavelength exited has a predetermined intensity within the range of a predetermined wavelength interval, as shown in FIG. 15. It means that the width of the full width at half maximum in this intensity distribution is small. In other word, this means that wavelength resolving power is high.

Embodiment 1

Hereafter, embodiments of the present invention will be explained using drawings.

Figure 1A:
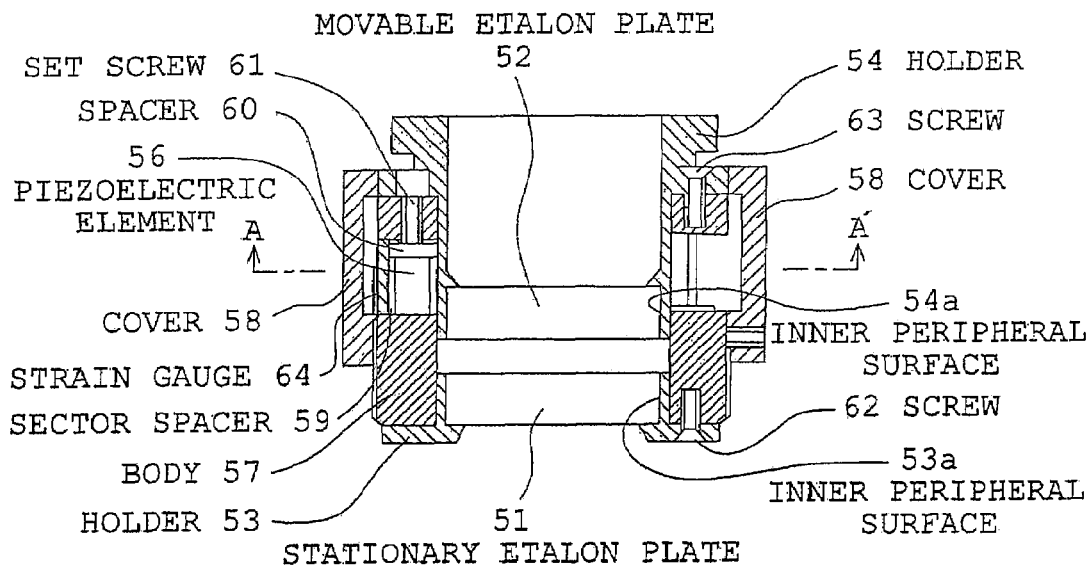
FIGS. 1A and 1B are outline vertical sectional diagrams showing an example of composition of a conventional etalon device.
Figure 1B:
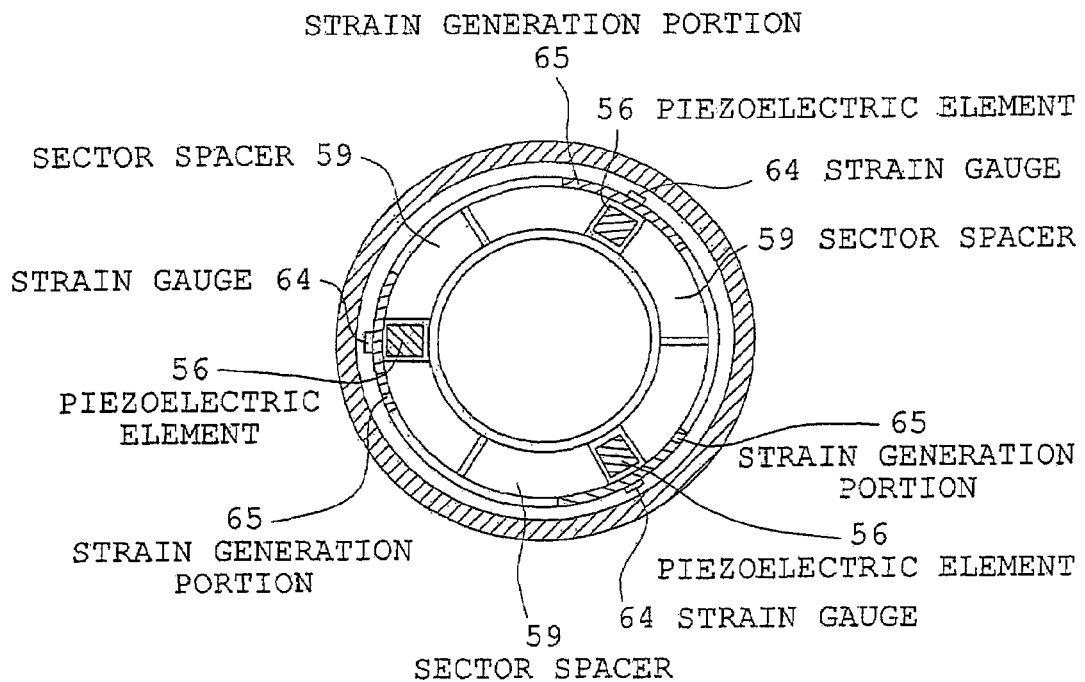
Figure 2:
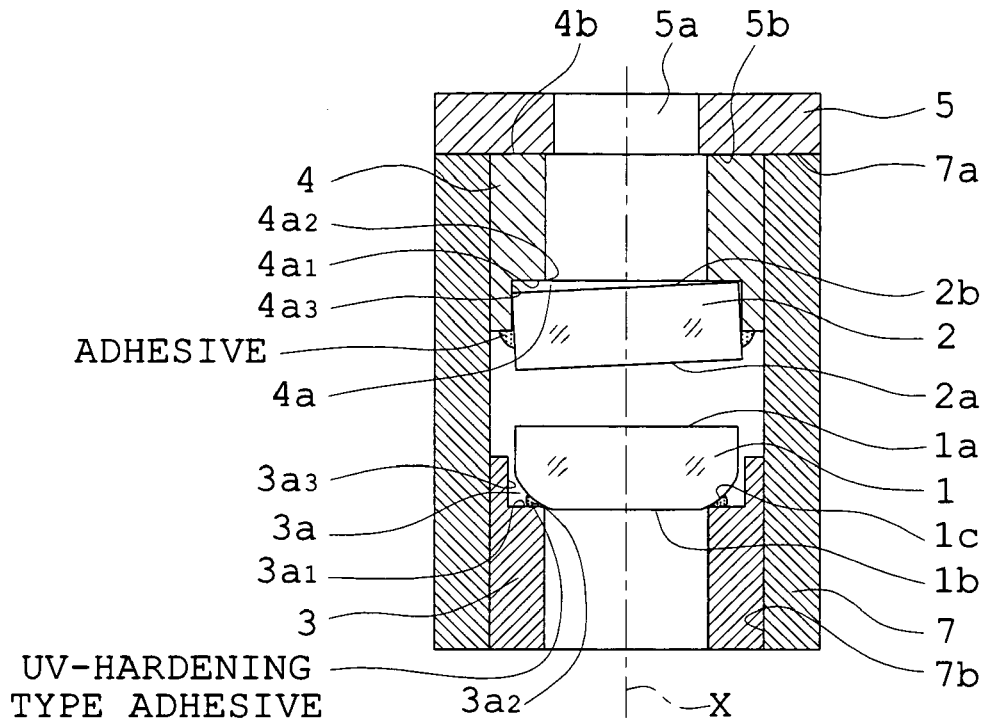
FIG. 2 is a sectional diagram showing an outline configuration showing a state in the course of assembling of an etalon device of a first embodiment according to the present invention.
Figure 3:
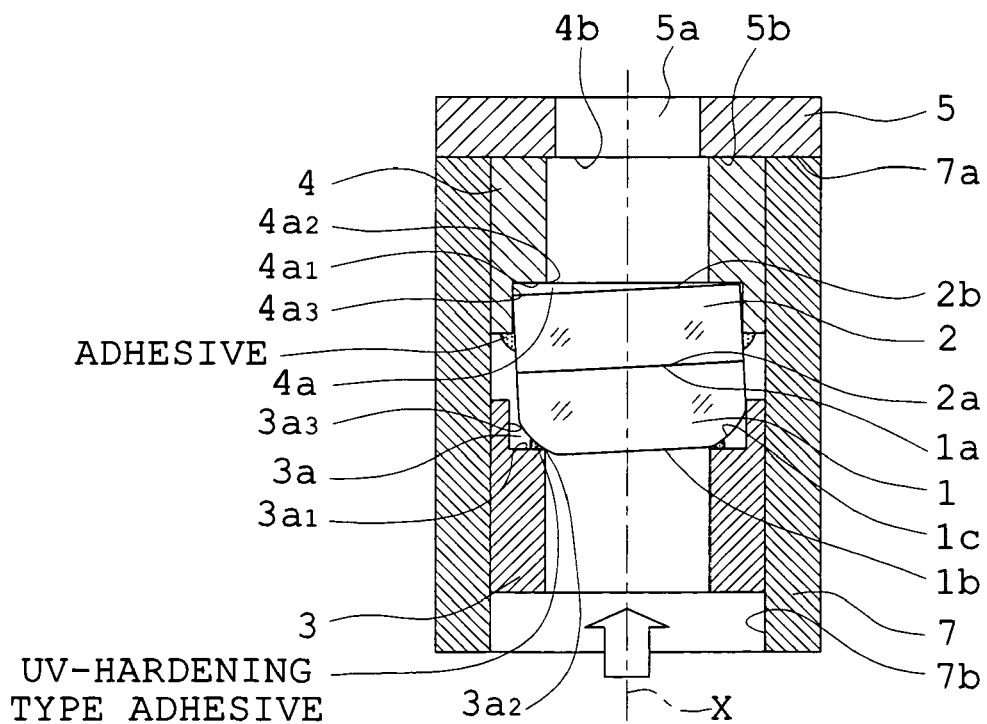
FIG. 3 is a sectional diagram showing a state that each of the surfaces of parallel plates which is faced each other in FIG. 2 is stuck firmly.

FIG. 2 is a sectional diagram showing an outline configuration showing a state in assembling process of an etalon device of the embodiment 1 according to the present invention. FIG. 3 is a sectional diagram showing a state that each of the surfaces of the parallel plates which is faced each other in assembling process of the etalon device in FIG. 2 is stuck firmly.

The etalon device of the embodiment 1, is constituted such that it comprises a pair of parallel plates 1 and 2, a pair of holders 3 and 4, a plate 5, and a housing 7 The parallel plates 1 and 2, are formed in thin-strip disk shape, respectively, and each of them is arranged so as to be faced each other. The parallel plate 1 has a surface 1a facing the parallel plate 2, and a surface 1b arranged at the opposite side. Another parallel plate 2 has a surface 2a facing the parallel plate 1, and a surface 2b arranged at the opposite side.

Holders 3 and 4 are formed as cylindrical shape, where a hole penetrated to axis orientation is formed in the central part, respectively. In the holders 3 and 4 recessed portions 3*a* and 4*a* are arranged respectively. These recessed portions 3*a* and 4*a* are concave portions, and are arranged in order to hold the parallel plates 1 and 2 individually, and respectively. In the recessed portions 3*a* and 4*a*, the bottom surfaces a1 and 4*a*1 are formed in the plane, respectively, so that the surface 1*b* (including a spherical surface portion 1*c* which will be mentioned later) of the parallel plate 1, and the surface 2*b* of the parallel plate 2 may touch them. Furthermore, edges 3*a*2 and 4*a*2 are formed on each end of bottom surface 3*a*1 and the end of 4*a*1. On the other hand, each end of the bottom surfaces 3*a*1 and 4*a*1 touches each of side surfaces 3*a*3 and 4*a*3 respectively. Here, an inside diameter (inner peripheral surface diameter) of the recessed portion 3*a* is larger than an outside diameter of the parallel plate 1. A size of the space formed of the difference mentioned above is a size to such an extent that the parallel plate 1 can be tilted within a predetermined range. Here, an inside diameter (inner peripheral surface diameter) of the recessed portion 4*a* is slightly larger than an outside diameter of the parallel plate 2. A size of the space formed of the difference mentioned above is a size to such an extent that adhesives can be filled up within a predetermined range.

The plate 5 is formed in the disk shape where the hole 5*a* is formed at the central part. The housing 7 is formed as cylindrical shape, where the hole is penetrated to axis orientation. As for this housing 7, an end face 7*a* of its end part is fixed to the predetermined part of an inner surface 5*b* of the plate 5 by adhesion. Here, an inside diameter of housing 7, namely, a diameter of the fitting hole 7*b*, almost coincides with an outside diameter (diameter of a perimeter surface) of the holders 3 and 4. Therefore, holders 3 and 4 are held by fitting into housing 7. Moreover, a diameter of hole 5*a* is smaller than an inside diameter (diameter of an inner peripheral surface) of the holder 4. Therefore, the plate 5 touches the holder in such state that an end face 4*b* of the holder 4 touches the inner surface 5*b* of the plate 5. Thereby, the housing 7 holds the holder 4 in such state that it is fixed in inside of the end part. Moreover, the housing 7 holds the holder 3 so as to slide in the direction along a center axis X in the inside of the other end part. The center axis X is also a center axis of the holders 3 and 4 or the housing 7. The parallel plate 1 is equipped with the surface 1*a* and the surface 1*b*. The surface 1*a* is formed to be a plane from the center to the outer peripheral edge. On the other hand, on the surface 1*b* at the opposite side, a spherical surface portion 1*c* is formed as an inclined surface, within a predetermined range of an outer peripheral edge (outer peripheral portion). The position of this spherical surface portion 1*c* corresponds to a part in which an edge 3*a*2 of the holder 3 touches the parallel plate 1. The form of the inclined surface is a surface of a spherical shape which has a sphere's center on the center axis of the outside diameter of the parallel plate 1. In the shape of the spherical surface of this embodiment, the sphere's center is located nearly to the surface 1*a* rather than the surface 1*b*. Therefore, the shape of the spherical surface is formed convex form toward the side of the holder 3. The parallel plate 1 is mounted on the holder 3 in such state that the spherical surface portion 1*c* touches the edge 3*a*2. Thereby, when the parallel plate 1 is mounted on the holder 3, according to the principle of "spherical surface receiving", tilt operation is possible to the direction of the center axis X for the surface 1*a* of the parallel plate 1.

Another parallel plate 2 is equipped with the surface 2*a* and the surface 2*b*. The surfaces 2*a* and 2*b* are formed to be a plane from the center to the outer peripheral edge. The parallel plate 2 is mounted on the recessed portion 4*a* of the holder 4. Here, mounting of the parallel plate 2 is carried out by dropping the parallel plate 2 into the recessed portion 4*a* as usual. Therefore, there are cases; that is, the surface 2*b* at opposite side may be mounted on the bottom 4*a*1 in surface contact state, or without surface contact state. The former case of is an ideal state. In this case, the normal and the center axis X of the surface 2*a* of the parallel plate 2 become parallel. On the other hand, in the case of the latter, it is not ideal state, and the normal and the center axis X of the surface 2*a* of the parallel plate 2 become nonparallel. In this embodiment, it is assumed that the parallel plate 2 is mounted in the state of the latter case.

Next, the outline of the assembly adjustment procedure of the etalon device equipped with such component parts will be explained. First, the parallel plate 2 is mounted on the recessed portion 4*a* of the holder 4. At this time, the normal of the surface 2*a* and the center axis X are not parallel. In such state, adhesives are dried, after applying adhesives to the space between the parallel plate 2 and the recessed portion 4*a* of the holder 4. Thereby, the parallel plate 2 is fixed to the holder 4. Here, a combination of the holder 4 and the parallel plate 2 is called a subassembly here. At this time, the parallel plate 2 is being fixed to the holder 4. In this embodiment, this subassembly is called a stationary side subassembly.

Next, the end face 7*a* of the housing 7 is arranged so as to touch the inner surface 5*b* of the plate 5 are touched. As for fixation of the housing 7 and the plate 5, For example, there are fixation by using adhesion, and fixation by using a screw (not illustrated). Then, the holder 4 is inserted in a fitting hole 7*b* of the housing 7. In that case, the holder 4 is inserted so that the end face 4*b* of the holder 4 may touch the inner surface 5*b* of the plate 5. Fixing of the holder 4 may be made also by using adhesion or a screw (not illustrated).

Next, the parallel plate 1 is mounted on the recessed portion 3*a* of the holder 3. Prior to mounting of the parallel plate 1, ultraviolet hardening type adhesives is applied to the periphery of the edge 3*a*2 of the recessed portion 3*a* of the holder 3. In such state, the parallel plate 1 is mounted on the recessed portion 3*a*. Here, a combination of the holder 3 and the parallel plate 1 is called the subassembly here. At this time, hardening processing of the applied adhesives has not been carried out. Therefore, a tilt operation is possible for the parallel plate 1 to the holder 3 through the spherical surface portion 1*c*. In this embodiment, this subassembly is called an adjustment side subassembly.

Next, the holder 3 is inserted in the fitting hole 7*b* of the housing 7. Thus, when assembly operation is carried out in this way, a pair of parallel plates 1 and 2 is arranged so as to be faced each other as shown in FIG. 2. At this time, the parallelism of the surfaces of the parallel plates 1 and 2 each of which is faced each other has not been adjusted, and a predetermined quantity of tilt has arisen between each of surfaces.

Next, thrust is given from a lower part to the holder 3. Thereby, after having been guided by the fitting hole 7*b*, the holder 3 is slid to upward direction. If the holder 3 continues to be slid to upward direction, the parallel plate 1 contacts the parallel plate 2 (FIG. 3). Furthermore, if the holder 3 is further slid upward direction, the parallel plate 1 will receive thrust from a direction along the center axis X (namely, direction along sliding direction) through the parallel plate 2. Then, in a state having touched on the edge 3*a*2, the spherical surface portion 1*c* moves as it is slipped. That is, the tilt operation of the parallel plate 1 is carried out through the spherical surface portion 1*c*, while touching on the edge 3*a*2. If the holder 3 continues further to be slid to upward direction, the parallel plate 1 and the parallel plate 2 are stuck firmly by each of the surfaces 1a and 2a. Thereby, the parallel plate 1 of the adjustment side subassembly becomes a state where the parallelism is adjusted with high precision to the parallel plate 2 of the stationary side subassembly. When such state has been attained, sliding upward direction of the holder 3 is stopped. Then, UV light is irradiated to the adjustment side subassembly. By this irradiation, the ultraviolet hardening type adhesive that has been applied beforehand is stiffened. Thereby, the parallel plate 1 of the adjustment side subassembly is fixed at its position in such state that the parallelism has been adjusted with high precision to the parallel plate 2 of the stationary side subassembly. Thereby, the assembly adjustment of the etalon device in this embodiment is completed. Hereafter, as an etalon device, it is used by moving the adjustment side subassembly so that it may have a desired surface separation.

Thus, according to the present embodiment, the parallelism of the parallel plate 1 and the parallel plate 2 can be adjusted with high precision (almost parallel) and simple composition. Particularly, when the parallel plate 2 is mounted on the recessed portion 4a of the holder 4, even if the parallel plate 2 cannot be mounted in an ideal state, it is not necessary to mount it again. Therefore, the assembly adjustment of an etalon device can be carried out easily, in a short time.

Embodiment 2

Figure 4:
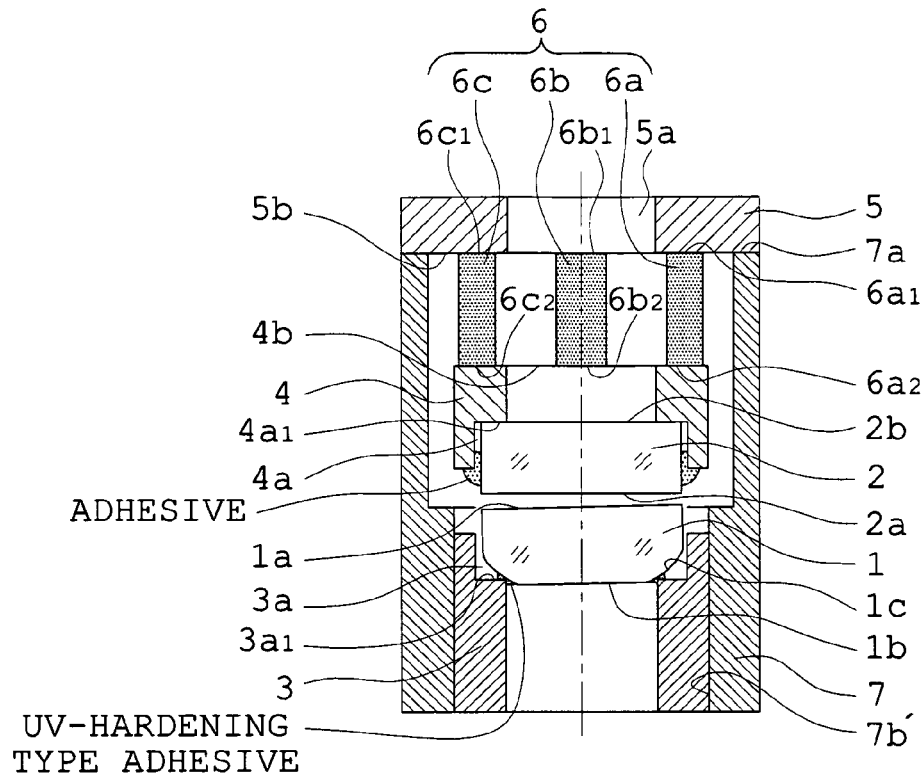
FIG. 4 is a sectional diagram showing an outline configuration showing a state in assembling of an etalon device of a second embodiment according to the present invention.
Figure 5:
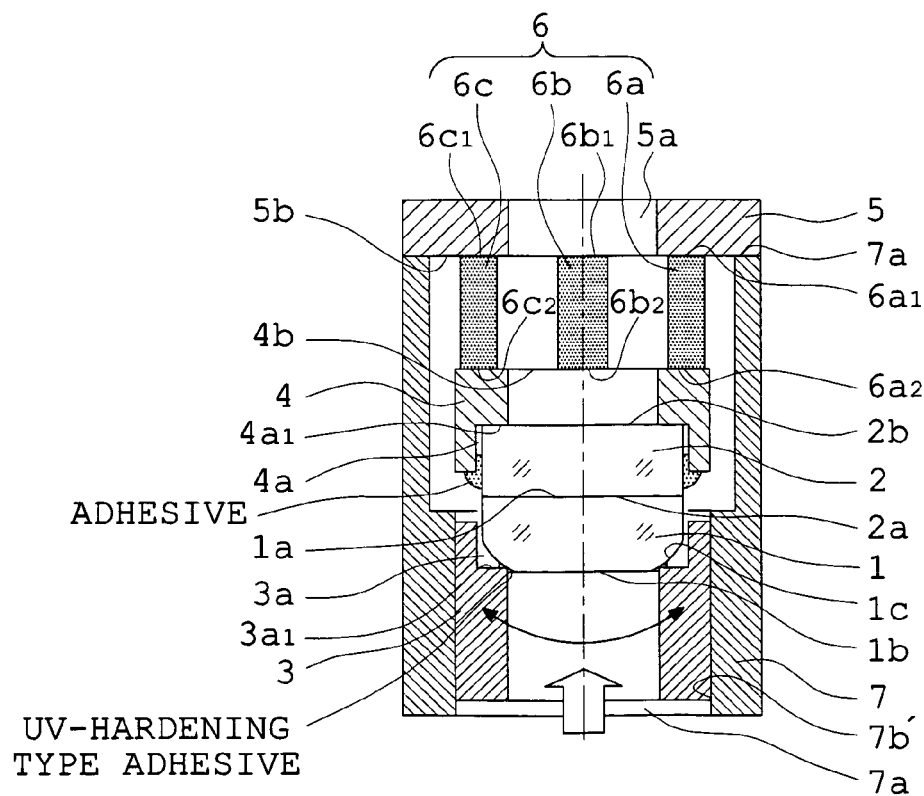
FIG. 5 is a sectional diagram showing a state that each of the surfaces of parallel plates which is faced each other in FIG. 4 is stuck firmly.

FIG. 4 is a sectional diagram showing a predetermined state in the course of the assembling process of an etalon device of an embodiment 2 according to the present invention. FIG. 5 is a sectional diagram showing a state that each of the surfaces of parallel plates which is faced each other in the assembling process of the etalon device of FIG. 4 is stuck firmly. The embodiment 2 differs to that of the embodiment 1 in the following points.

A piezoelectric element portion 6 (6a, 6b, 6c) is provided as a surface separation variable means.

The parallel plate 2 is mounted on the holder 4, in such state that each of surfaces is contacted.

There is a level difference in the inner peripheral surface of the housing.

The piezoelectric element portion 6 is arranged between the plate 5 and the holder 4. This piezoelectric element portion 6 consists of three piezoelectric devices 6a, 6b, and 6c. The three piezoelectric devices 6a, 6b, and 6c are arranged around the hole 5a of the plate 5 at equal intervals. Further, each of end surfaces 6a1, 6b1, and 6c1 of the piezoelectric devices 6a, 6b, and 6c, is fixed by adhesive to the inner surface 5b of the plate 5, respectively. Similarly, each of other end surfaces 6a2, 6b2, and 6c2 of the piezoelectric devices 6a, 6b, and 6c, is fixed by adhesive to the end surface 4b arranged at the opposite side of the holder 4, respectively. Thus, in this embodiment the housing 7 is fixed to the plate 5 with adhesive, by the end face 7a of its end part at a predetermined position which is outside of the positions where the piezoelectric devices 6a, 6b, and 6c have been fixed by adhesion. The housing 7 has a fit-hole 7b' in which its inner diameter is formed slightly larger than the outside diameter of the holder 3. Further, the housing 7 holds the holder 3 so that it may be slid by fitting it into the fitting hole 7b'. Thereby, the housing 7 holds the holder 4 through the piezoelectric devices 6a, 6b, and 6c and the plate 5. The parallel plate 2 is mounted on the holder 4 in state of surface contact with a bottom surface 4a1 of the holder 4. Therefore, in this embodiment, the normal and the center axis X of the surface 2a of the parallel plate 2 are parallel (coincidence).

Next, outline of the assembly adjustment procedure of the etalon device according to the embodiment 2, which is equipped with such component parts will be explained.

With respect to assembling of the stationary side subassembly and the adjustment side subassembly and assembling of the housing 7 of the plate 5, they are almost the same as the first embodiment. Therefore, assembling of the piezoelectric element portion 6 will is explained, and other explanations about the other assembling will be omitted here.

Firstly, an adhesive is applied to each of end surfaces 6a2, 6b2 and 6c2 of the piezoelectric devices 6a, 6b and 6c, Then, the piezoelectric devices 6a, 6b, and 6c are fixed with the adhesive to the end surface 4b of the holder 4. At that time, the piezoelectric devices 6a, 6b, and 6c are arranged so as to have equal intervals. Next, the subassembly of the holder 4 and the piezoelectric devices 6a, 6b, and 6c is fixed with the adhesive to the plate 5. Thus, the piezoelectric devices 6a, 6b, and 6c are arranged around the hole 5a at an equal interval. At this time, the parallel plate 2 is fixed to the holder 4. In this embodiment, this subassembly is called the stationary side subassembly. As for assembling of other parts, it is almost the same as the first embodiment mentioned above.

After assembling of parts is completed, adjustment is carried out. Outline of procedure of adjustment is almost the same as the first embodiment mentioned above. First, the piezoelectric devices 6a, 6b, and 6c are driven (extended), and the stationary side subassembly is moved to a downward direction as shown in FIG. 4. Next, thrust is given from a lower side to the holder 3. Thereby, the holder 3 is slid to upward direction, in a state that it is being guided by the fitting hole 7b'. If the holder 3 continues to be slid to upward direction, the parallel plate 1 contacts the parallel plate 2. Furthermore, if the holder 3 is further slid to upward direction, the parallel plate 1 will receive thrust from a direction along the center axis X (namely, direction along sliding direction) through the parallel plate 2.

Then, in a state having touched on the edge 3a1, the spherical surface portion 1c moves so that it may be slipped.

That is, the tilt operation of the parallel plate 1 is carried out through the spherical surface portion 1c, while touching on the edge 3a1 of the holder 3.

If the holder 3 continues further to be slid to upward direction, the parallel plate 1 and the parallel plate 2 become in such state that each of surfaces 1a and 2a is stuck firmly each other (FIG. 5). Thus, the parallel plate 1 of the adjustment side subassembly becomes a state where the parallelism is adjusted with high precision to the parallel plate 2 of the stationary side subassembly.

In such state, sliding to upward direction of the holder 3 is stopped. Then, the holder 3 is fixed to the housing 7 (by adhesive or screw). Then, UV light is irradiated to the adjustment side subassembly. By this irradiation the ultraviolet hardening type adhesive that has been applied beforehand is stiffened. Thus, the parallel plate 1 of the adjustment side subassembly is fixed at its position in such state that the parallelism has been adjusted with high precision to the parallel plate 2 of the stationary side subassembly. Thereby, the assembly adjustment of the etalon device in this embodiment is completed. After this, it is used by changing intervals of a desired surface through the piezoelectric devices 6a, 6b, and 6c, if necessary.

Thus, by this embodiment as well as the embodiment 1, the parallelism of the parallel plate 1 and the parallel plate 2 can be adjusted with high precision (almost parallel). Also in the constitution the embodiment 1, if the piezoelectric element portion 6 is arranged at the holder 3 side, the separation between the surfaces can be changed.

The etalon device according to the present invention is not restricted to the constitution mentioned above. For example, with respect of the tilt mechanism, for example, an outer peripheral edge of the surface 1b at an opposite surface in the parallel plate 1 is formed to be a form having an edge. On the other hand, an inclined portion is arranged at the holder 3. As the form of the tilt portion, for example, the recessed portion 3a of the holder 3 may be formed so as to have recessed corners with curvature (equivalent to an inclined surface), (refer to FIG. 7).

Figure 6A:
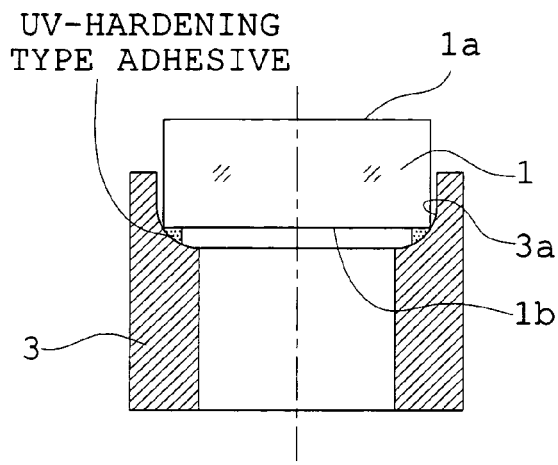
FIGS. 6A and 6B are sectional diagrams of principal portions showing modified examples of the parallel plate and the holder in embodiment 1 and embodiment 2, wherein an example in which an inclined portion is prepared on the holder, and an example in which the tilt portion is prepared on both of the holder and the parallel plates are shown.
Figure 6B:
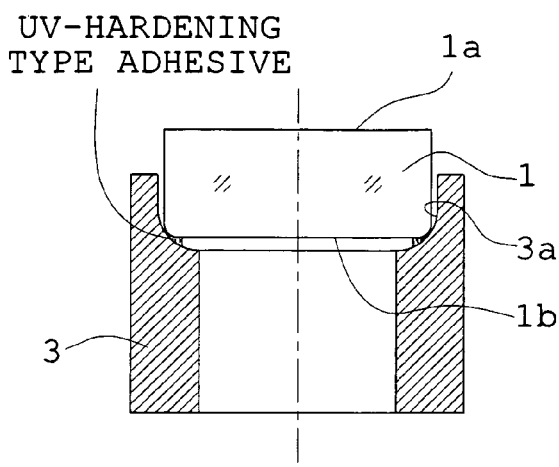

FIGS. 6 A and 6 B are sectional diagrams of principal portions showing modified examples of the parallel plate and the holder in each embodiment mentioned above. As shown in the modification of FIG. 6 A, in case that an inclined portion is formed in the recessed portion 3a of the holder 3, tilt operation of the parallel plate 1 can be carried out. Namely, the parallel plate 1 receives thrust from a direction along a line between center axes of the holders 3 and 4 (namely, direction along sliding direction) through the parallel plate 2. At this time, the edge of the surface 1b of the parallel plate 1 moves while touching (sliding) the recessed portion 3a of the holder 3, i.e., the recessed portion having curvature at recessed corner. As a result, the parallel plate 1 carries out a tilt operation. Thus, as for the parallel plate 1 of the movable subassembly, the parallelism is adjusted with high precision to the parallel plate 2 of the stationary side subassembly. Furthermore, as shown in FIG. 6 B, an inclined portion may be formed on the both of the recessed portion 3a of the parallel plate 1 and the holder 3. In the embodiment and the modification mentioned above, the tilt portion is a curved surface, but a plane, or a combination of a plane and a curved surface may be used.

Figure 7:
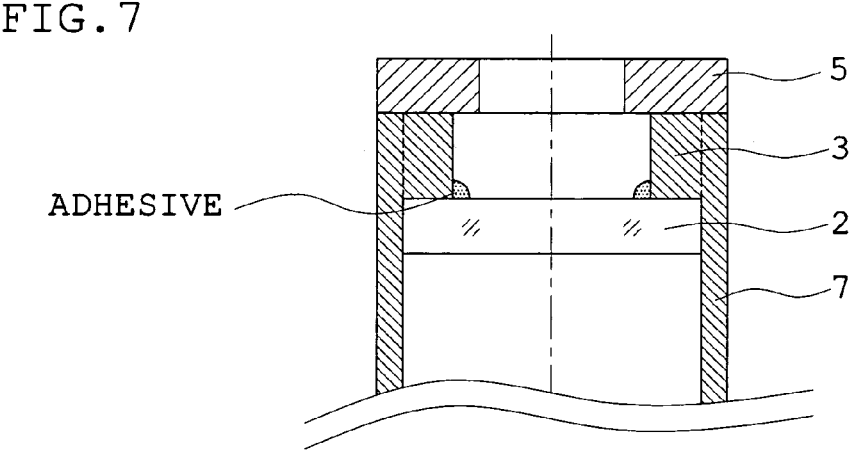
FIG. 7 is a sectional diagram of principal portion showing a modified example where a holder is formed in one with a housing in an embodiment of the etalon device of the present invention.
Figure 8:
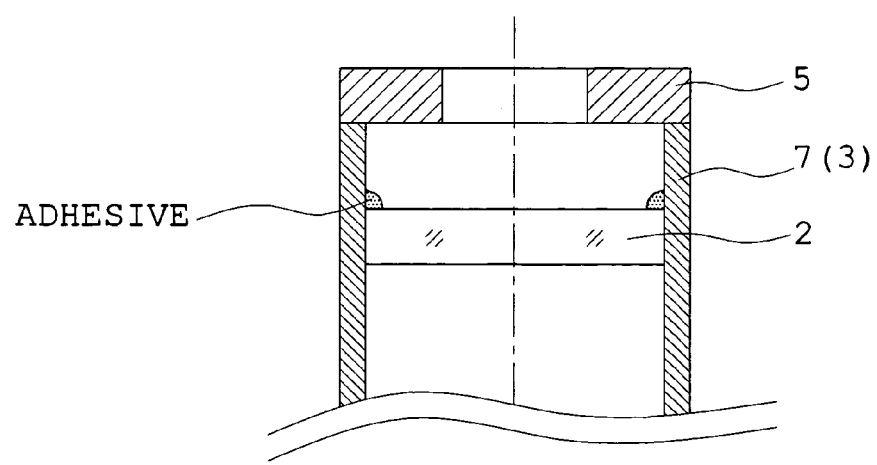
FIG. 8 is a sectional diagram of principal portion showing a modified example where the housing is functioning as a holder in an embodiment of the etalon device of the present invention.

In the two embodiments mentioned above, the holders 3 and 4 correspond to holder portions, and the housing 7 corresponds to a housing portion. However, since the holder 3 and the housing 7 are different objects, a word "portion" has been omitted. However, out of the holder 3, the housing 7 and the plate 5, at least two components may be made into one, as one component. For example, as shown in FIG. 7, the holder 3 and the housing 7 are formed into one component. In this case, it can be explained that this one component has a holder portion and a housing portion. Furthermore, as shown in FIG. 8, it is also possible to compose such that the housing 7 itself functions also as the holder 3. In this case, it can be explained that a housing portion is also a holder portion. In such composition, what is necessary to fix the parallel plate 2 is as follows.

Figure 9A:
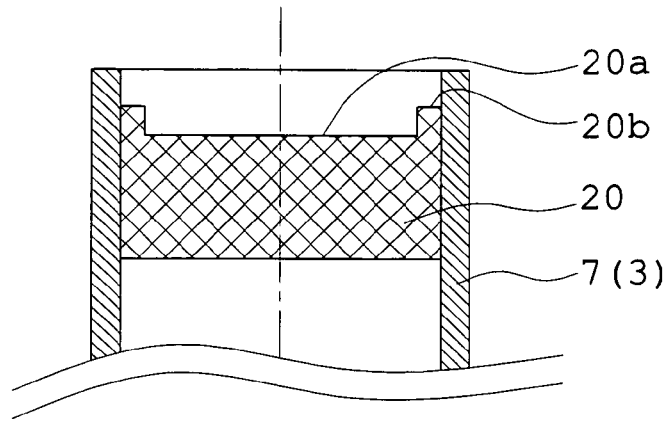
FIGS. 9A and 9B and 9C are explanatory diagrams showing a method how to fix a parallel plate on the housing of FIG. 8.
Figure 9B:
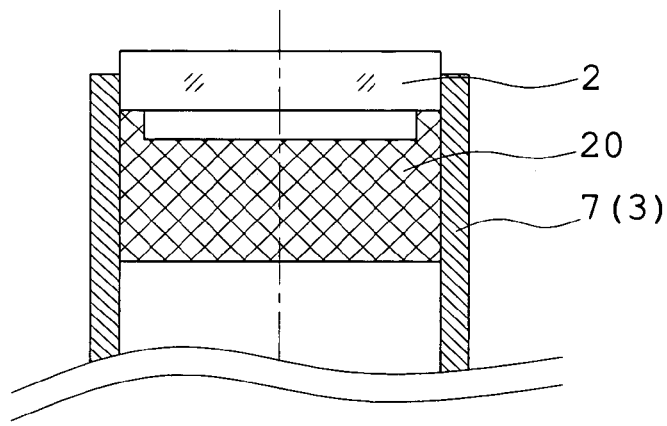
Figure 9C:
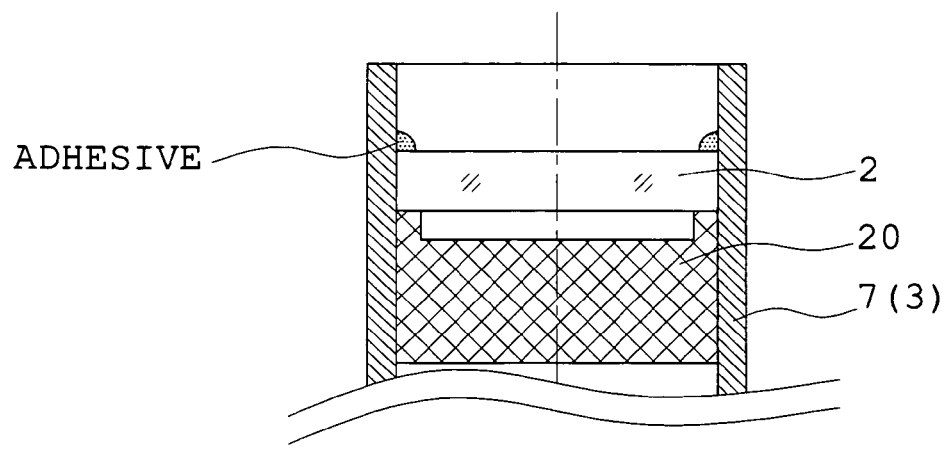

Firstly, as shown in FIG. 9 A, a jig 20 is inserted in the inside of the housing 7. The jig 20 is manufactured so that it t may be fitted into the housing 7. A recessed portion 20a is arranged on one of surfaces of the jig 20. The recessed portion 20a is formed so that it may become larger than the effective diameter of the parallel plate 2. It is composed so as to contact the outside portion of the effective diameter in the parallel plate 2 at an outer edge portion 20b outside the recessed portion 20a. The jig is located at the other-end-surface side rather than one end surface side of the housing 7 in the inside of the housing 7. By this way, the parallel plate 2 can be held by an inner peripheral surface of the housing 7, and the outer edge portion 20b of the jig 20. Next, as shown in FIG. 9 B, the parallel plate 2 is inserted from the recessed portion 20a side of the housing 7, and the parallel plate 20 is mounted on the outer edge portion 20b of the jig 20. Then, the jig 20 is further moved into the inside of the housing 7, and it is stopped in a predetermined position, as shown in FIG. 9 C. After that, an adhesive is applied and the parallel plate 2 is fixed to the housing 7. Then, the jig 20 is picked out from the housing 7, and the plate 5 is fixed to the housing 7 as shown in FIG. 8.

The assembling method mentioned above can be applied also to a case that the stationary side subassembly as shown in FIG. 10 and FIG. 11 is fixed to the housing 7. Furthermore, the jig 20 can be used also for assembling of the stationary side subassembly of FIG. 12. In the stationary side subassembly of FIG. 12, an inclined surface is arranged at least at one of the parallel plate and the holder portion. Therefore, by mounting only the parallel plate on the holder portion, the parallel plate cannot be mounted on the holder portion so that the surface of the parallel plate may become perpendicular to the center axis of the holder portion. Then, the jig 20 is arranged so as to touch from one of surface sides (namely, a surface side which is at opposite side to the holder portion) of the parallel plate. Thereby, the parallel plate can be mounted on the holder portion so that the surface of the parallel plate may become perpendicular to the center axis of the holder portion. In =that state, the parallel plate may be fixed to the holder portion with adhesives, etc.

As mentioned above, according to the embodiments mentioned above, in spite of simple composition, the parallelism of the surfaces of the etalons which are faced can be adjusted with sufficient accuracy, and the etalon device can be assembled. Moreover, even when a surface separation variable means is arranged, the etalon device which is small, and has high resolving power and accuracy is obtained. Next, examples of application in which the etalon device of the present invention manufactured using the production method of the present invention is applied to the optical device will be explained.

Figure 13:
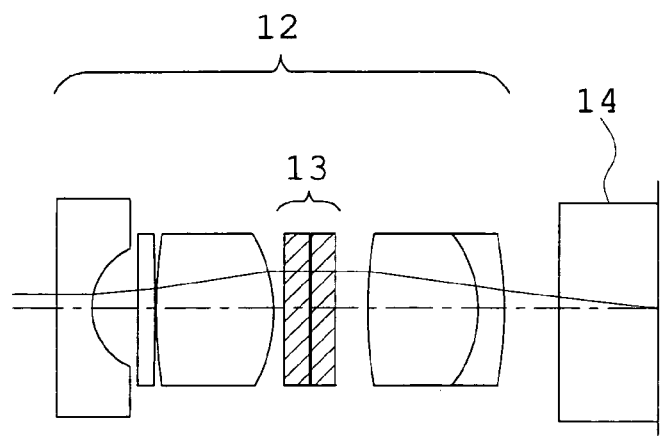
FIG. 13 is an explanatory diagram of principal portion showing an example of application of the etalon device according to the present invention to an objective optical system in an endoscope equipment.

FIG. 13 is an explanatory diagram of principal portion showing an example of application of the etalon device of the present invention to an objective optical system of an endoscope equipment. In FIG. 13, numerical symbol 12 is an objective lens, numerical symbol 13 is the etalon device according to the present invention, numerical symbol 14 is a detector using an image sensor (CCD). What is shown in the embodiment 2 is used for the etalon device 13. In FIG. 13, for convenience sake of explanation, detailed composition of the etalon device is omitted, and only a pair of parallel plates which are faced is shown. In the endoscope equipment of FIG. 13, the etalon device 13 is arranged near the position of an aperture stop of the optical system constituting an objective lens 12. In such an air gap variable type etalon, if a separation (air gap) between substrates is controlled and scanning of a peak wavelength is carried out, a desired wavelength band can be chosen. Accordingly, if an air gap adjustment is carried out using this air gap variable type etalon device, for example, in an endoscope equipment, an image of arbitrary wavelength bands can be detected.

Thus, if the etalon device in which the air gap is variable as mentioned above is used to an optical device which needs wavelength-band conversion. The whole optical system can be miniaturized, wavelength-band conversion rate can be accelerated, and saving of electric power consumption can be achieved.

Figure 14:
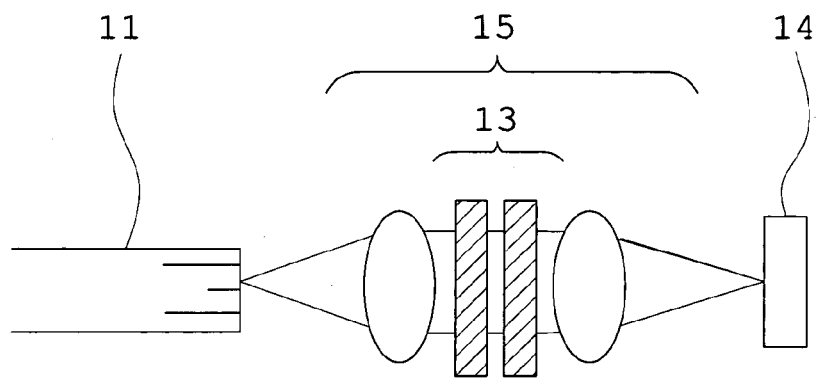
FIG. 14 is an explanatory diagram of a principal portion to showing an example of application of the etalon device according to the present invention to an eyepiece optical system in an endoscope equipment.

FIG. 14 is an explanatory diagram of a principal portion showing an example of application of the etalon device of the present invention to an eyepiece optical system of an endoscope equipment. In FIG. 14, numerical symbol 15 is an optical system in which image forming or condensing of the fiber bundle and fiber 11 of the endoscope on the detector 14 using an image sensor (CCD). What is shown in the embodiment 2 is used for the etalon device 13. In FIG. 14, for convenience sake of explanation, only a pair of the parallel plates which are faced is shown, and detailed composition of the etalon device is omitted. In the endoscope equipment of FIG. 14, the etalon device 13 is arranged near the position of an aperture stop of the optical system constituting an image forming optical system 15. In such air gap variable type etalon, if a separation (air gap) between substrates is controlled and scanning of a peak wavelength is carried out, a desired wavelength band can be selected. Then, also in the endoscope equipment of FIG. 14, as same as the example of application of FIG. 13, if an air gap adjustment is carried out using the air gap variable type etalon device, for example, in a bundle fiber type endoscope equipment, an image of arbitrary wavelength bands can be detected.

The present invention is useful in fields where optical systems such as Fabry-Perot type light interferometer, a spectrum analyzer, etc., to which an etalon device having small size with high resolving power and accuracy is applied is manufactured and used.

What is claimed is:

1. An etalon device comprising:
a first parallel plate and a second parallel plate arranged to face each other;
a first holder portion which holds the first parallel plate,
a second holder portion which holds the second parallel plate, and
a housing portion arranged outside of the first holder portion and the second holder portion,
wherein at least one of the first holder portion and the second holder portion has a concavity with an inside diameter larger than an outside diameter of a mating parallel plate, which is the first parallel plate or the second parallel plate, so that the mating parallel plate rests in the concavity,
wherein inside the concavity, a receiving portion, with which the mating parallel plate is in contact, is provided, and
wherein at a position where the receiving portion is in contact with the mating parallel plate, an inclined face is formed at least on one of the receiving portion and the mating parallel plate.

2. The etalon device according to claim 1, wherein the inclined face is formed on an outer peripheral portion of the parallel plate.

3. The etalon device according to claim 2, wherein the inclined face is shaped as a curved surface.

4. The etalon device according to claim 3, wherein it further comprises a separation variable means for changing a surface separation between the first parallel plate and the second parallel plate.

5. The etalon device according to claim 2, wherein it further comprises a separation variable means for changing a surface separation between the first parallel plate and the second parallel plate.

6. The etalon device according to claim 1, wherein the inclined face is formed at a predetermined position of the concavity, and the predetermined position is a position with which the outer peripheral portion of the mating parallel plate is in contact.

7. The etalon device according to claim 1, wherein the inclined face is shaped as a curved surface.

8. The etalon device according to claim 7, wherein it further comprises a separation variable means for changing a surface separation between the first parallel plate and the second parallel plate.

9. The etalon device according to claim 1, wherein the inclined face is shaped as a plane surface.

10. The etalon device according to claims 1, wherein the inclined face is shaped to include a plane surface portion and a curved surface portion.

11. A manufacturing method of an etalon device comprising:
a process for arranging a first parallel plate and a second parallel plate to face one another;
a process for temporarily holding the first parallel plate to allow for tilt movement;
a process for holding the second parallel plate in a fixed state;
a process for bringing a surface of the first parallel plate into contact with a surface of the second parallel plate, the surfaces facing each other; and
a process for fixing the first parallel plate.

* * * * *